(12) United States Patent
Kobayashi et al.

(10) Patent No.: US 6,622,477 B2
(45) Date of Patent: Sep. 23, 2003

(54) AIR/FUEL RATIO CONTROLLER FOR INTERNAL COMBUSTION ENGINE

(75) Inventors: Hideaki Kobayashi, Yokohama (JP); Shigeaki Kakizaki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/197,502

(22) Filed: Jul. 18, 2002

(65) Prior Publication Data

US 2003/0019485 A1 Jan. 30, 2003

(30) Foreign Application Priority Data

Jul. 27, 2001 (JP) ........................................ 2001-227010

(51) Int. Cl.[7] ................................................ F01N 3/00
(52) U.S. Cl. ............................ 60/276; 60/274; 60/285; 701/103; 701/109
(58) Field of Search .................... 60/274, 276, 277, 60/285; 123/690; 701/103, 109

(56) References Cited

U.S. PATENT DOCUMENTS

| | | | | |
|---|---|---|---|---|
| 5,678,402 A | * | 10/1997 | Kitagawa et al. | ............. 60/276 |
| 5,737,916 A | * | 4/1998 | Mitsutani | ..................... 60/276 |
| 6,116,021 A | * | 9/2000 | Schumacher et al. | ......... 60/274 |
| 6,289,673 B1 | * | 9/2001 | Tayama et al. | ................ 60/285 |
| 6,446,429 B2 | * | 9/2002 | Kobayashi et al. | ............ 60/285 |
| 6,481,201 B2 | * | 11/2002 | Kako et al. | .................... 60/285 |

FOREIGN PATENT DOCUMENTS

| | | |
|---|---|---|
| JP | 5-195842 | 8/1993 |
| JP | 7-259602 | 10/1995 |
| JP | 2000-120475 | 4/2000 |

* cited by examiner

*Primary Examiner*—Thomas Denion
*Assistant Examiner*—Binh Tran
(74) *Attorney, Agent, or Firm*—Foley & Lardner

(57) ABSTRACT

A catalyst which has an oxygen storage function is provided in the exhaust gas pipe 2 of an engine 1. The oxygen storage amount is estimated based on the output of the air/fuel ratio sensor 4 upstream of the catalyst 3. The air/fuel ratio is controlled so that the oxygen storage amount coincides with the target value. When the output of the downstream air/fuel ratio sensor 5 continuously displays a rich or a lean value for more than a determination time which is varied continuously with respect to operating conditions, deterioration in the upstream air/fuel ratio sensor 4 is detected. Thus the output of the upstream air/fuel ratio sensor 4 is corrected based on the output of the downstream air/fuel ratio sensor 5. In this manner, output fluctuations are corrected based on the deterioration of the air/fuel ratio sensor 4 upstream of the catalyst.

10 Claims, 7 Drawing Sheets

AIR/FUEL RATIO CONTROLLER FOR INTERNAL COMBUSTION ENGINE

FIELD OF THE INVENTION

This invention relates to a device for detecting and correcting fluctuations in the output characteristics of an air/fuel ratio sensor for an internal combustion engine.

BACKGROUND OF THE INVENTION

The gaseous environment of a catalyst must be maintained to a stoichiometric air/fuel ratio (hereafter referred to as "stoichiometric ratio") in order to enable simultaneous purification of HC, CO and NOx in the exhaust gas of an internal combustion engine using a three-way catalyst.

The catalyst which is provided with an oxygen storage function enables to maintain the catalyst gaseous environment to a stoichiometric ratio. In this manner, when the exhaust gas is leaner than a stoichiometric ratio, the catalyst adsorbs oxygen from exhaust gas until the oxygen storage amount is saturated, and the exhaust gas is richer than a stoichiometric ratio, oxygen stored by the catalyst is released so that the gaseous environment of the catalyst is maintained at a stoichiometric ratio. Consequently the catalyst can absorb an excess in oxygen or an oxygen deficiency resulting from temporary deviations in the air/fuel ratio. As a result, the gaseous environment of the catalyst can be maintained to a stoichiometric ratio displaying the high efficiency for exhaust gas purification as described above.

When the oxygen storage amount stored in the catalyst is controlled for example to coincide with half of the maximum storage amount, the capacity for adsorbing oxygen equals the capacity for releasing oxygen. Therefore even when the air/fuel ratio deviates from a stoichiometric ratio to a lean or rich value, the catalyst continues to display a high absorbing performance and optimal purification efficiency for exhaust gas can be maintained.

JPA 5-195842 and JPA 7-259602 propose control of an oxygen storage amount in which control is performed based on the output of an air/fuel ratio sensor disposed upstream of the catalyst.

The controller calculates an oxygen excess/deficiency amount of the exhaust gas flowing into the catalyst based on the output of the air/fuel ratio sensor in order to calculate the oxygen storage amount of the catalyst. On this basis, the air/fuel ratio is revised so that the oxygen storage amount coincides with a target value.

However fluctuation in the output air/fuel ratio characteristics occur as a result of the tendency of an air/fuel ratio sensor disposed upstream of the catalyst to deteriorate over time due to exposure to high exhaust gas temperatures. Furthermore such fluctuations also result from manufacturing discrepancies in the quality of the sensor. This has the direct consequence that the detected characteristics sometimes shift to rich or lean values. When an error occurs in the detection of the air/fuel ratio, since the oxygen storage amount of the catalyst is calculated based on the output of the air/fuel ratio sensor, the oxygen storage amount is also incorrect. As a result, the oxygen storage amount of the catalyst does not converge to the target amount.

SUMMARY OF THE INVENTION

It is therefore an object of this invention to accurately determine fluctuations in the output characteristics of an air/fuel ratio sensor.

It is a further object of this invention to correct the output of the air/fuel ratio sensor when the sensor output fluctuates and to control the oxygen storage amount of the catalyst correctly to the target value.

In order to achieve the above objects, this invention comprises

An air/fuel ratio control device for an internal combustion engine, comprising: a catalyst provided in the exhaust gas pipe, the catalyst having an oxygen storage function in which oxygen in the exhaust gas is adsorbed or released in response to the air/fuel ratio of the exhaust gas; an air/fuel ratio sensor disposed upstream of the catalyst in the exhaust gas pipe; an air/fuel ratio sensor disposed downstream of the catalyst in the exhaust gas pipe; and a controller which controls the air/fuel ratio.

The controller functions to estimate an oxygen storage amount of the catalyst based on the output of the air/fuel ratio sensor upstream of the catalyst; control the air/fuel ratio so that the oxygen storage amount coincides with a target value; perform a variable setting the determination time on the output of the air/fuel ratio downstream of the catalyst in response to the operating conditions; and correct the output of the upstream air/fuel ratio sensor when the continuous time after the output of the air/fuel ratio sensor downstream of the catalyst switches to a rich or a lean value exceeds the determination time.

The details as well as other features and advantages of the invention are set forth in the remainder of the specification and are shown in the accompanying drawings.

DESCRIPTION OF THE PREFERRED EMBODIMENTS

In order to describe the invention in greater detail, the preferred embodiments will be outlined below with reference to the accompanying figures.

Figure 1:
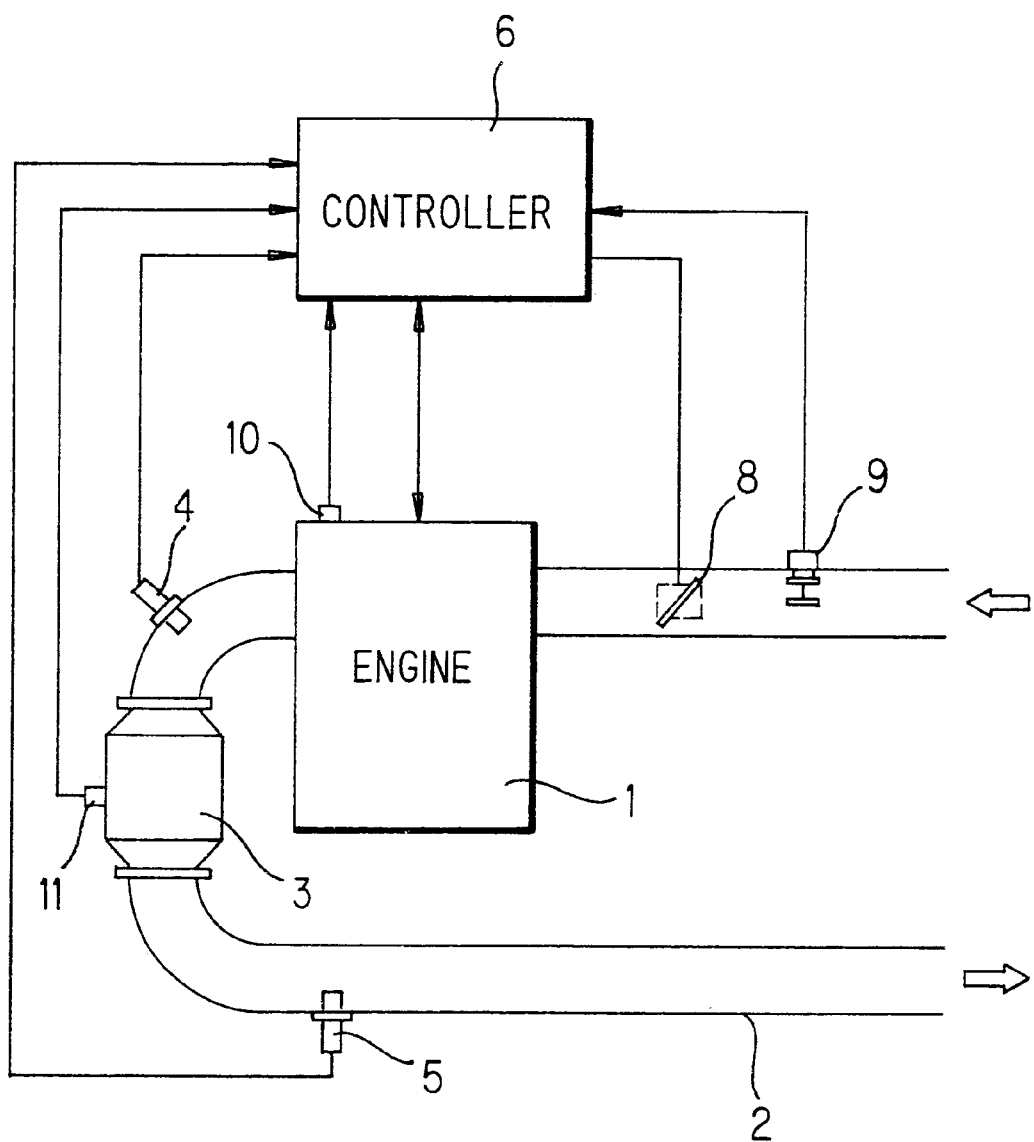
FIG. 1 is a schematic view of a first embodiment of this invention.

FIG. 1 is a schematic view of an exhaust gas purification device applying this invention. A catalyst 3 is provided in the exhaust gas pipe 2 in the engine 1. An air/fuel ratio sensor 4 is provided upstream and an air/fuel ratio sensor (oxygen sensor) 5 is provided downstream. A controller 6 is provided which controls the fuel supply amount to the engine 1 to coincide with a target air/fuel ratio based on the sensor output from the sensors 4 and 5.

A throttle valve 8 and an air flow meter 9 which measures an intake air amount varying with respect to the aperture of the throttle valve 8 are provided in the intake air pipe 7 of the engine 1.

The catalyst 3 is a three-way catalyst. When the catalyst gaseous environment has a stoichiometric ratio, NOx, HC and CO are purified with maximum efficiency. The catalyst 3 has a catalyst support covered with an oxygen storage material such as cerium. The catalyst 3 has the function (oxygen storage function) of storing or releasing oxygen in response to the air/fuel ratio of exhaust gas flowing into the catalyst.

An air/fuel ratio sensor 4 provided upstream of the catalyst 3 displays linear output characteristics which vary in response to the air/fuel ratio of the exhaust gas. The downstream air/fuel ratio sensor 5 detects the oxygen concentration in the exhaust gas.

A temperature sensor 10 detecting the temperature of the cooling water is provided in the engine 1. The controller 6 uses the output of this sensor when determining the operating conditions of the engine 1 or the activation state of the catalyst 3.

The controller 6 comprises a microprocessor, a RAM, a ROM and an I/O interface. The controller 6 calculates an oxygen storage amount in the catalyst 3 based on the output of the air flow meter 9 and the output of the upstream air/fuel ratio sensor 4. Feedback control is performed on the air/fuel ratio so that the oxygen storage amount coincides with a target value.

The controller 6 estimates an oxygen storage amount based on the air/fuel ratio of the exhaust gas upstream of the catalyst and the intake air amount at that time. For this purpose, firstly an oxygen excess ratio is calculated based on the exhaust air/fuel ratio upstream of the catalyst. The oxygen excess ratio expresses the excess or deficiency of oxygen in the exhaust gas. The oxygen excess ratio has a value of zero at a stoichiometric ratio, is positive when the exhaust gas is lean and negative when it is rich.

An oxygen amount which is adsorbed or released from the catalyst 3 can be distinguished on the basis of the oxygen excess ratio and the intake air amount at that time. It is possible to estimate an oxygen storage amount stored in the catalyst 3 by summing the oxygen amounts.

A maximum value for the oxygen storage amount stored in the catalyst 3 is calculated in advance by experimentation. For example, a storage amount corresponding to half the maximum value is set as a target value and the air/fuel ratio of the engine is controlled so that the oxygen storage amount coincides with the target value.

When the calculated oxygen storage amount is smaller than the target value, the target air/fuel ratio is made leaner the storage amount is increased. Conversely when the oxygen storage amount is greater than the target value, the target air/fuel ratio is made richer and the oxygen storage amount decreased. This control routine allows the oxygen storage amount to coincide with the target value.

However the target value for the air/fuel ratio may also be determined from the operating requirements for the engine. Since a stoichiometric ratio is basically taken to be a target value, revision of the air/fuel ratio when the oxygen storage amount deviates from the target value is limited to an amplitude which has no adverse effect on engine performance.

The method of calculating the oxygen storage amount of the catalyst 3 is disclosed in detail in Japanese Patent Application No. 10-295110 which was filed in Japan by the present applicant.

The controller 6 according to this invention determines whether or not the output of an upstream air/fuel ratio sensor 4 is normal in order to calculate an oxygen storage amount. When the sensor 4 generates an output error due to deterioration in the sensor for example, that is to say, when the output characteristics shift towards a lean or a rich value, the output of the upstream air/fuel ratio sensor 4 is corrected corresponding to the shift amount and the oxygen storage amount converges correctly to the target value.

Since the oxygen storage amount of the catalyst 3 is normally controlled to the target value, the air/fuel ratio downstream of the catalyst is maintained to a stoichiometric ratio using the oxygen storage function of the catalyst even when some fluctuation is present in the air/fuel ratio upstream of the catalyst. When an error occurs in the output of the upstream air/fuel ratio sensor 4, the oxygen storage amount of the catalyst 3 gradually diverges from the target value. For example, when the output of the upstream air/fuel ratio sensor appears to shift to a richer value than the normal level, it is determined that oxygen is deficient and the air/fuel ratio is controlled towards lean values. When such a state continues, the actual oxygen storage amount of the catalyst becomes saturated and the downstream air/fuel ratio continues to shift from a stoichiometric ratio towards lean values.

When the continuous time in which the downstream air/fuel ratio has varied towards lean values exceeds a fixed value, the output of the upstream air/fuel ratio sensor 4 is taken to be undergoing fluctuation (output shift), and the output of the air/fuel ratio sensor 4 is corrected. The same considerations apply to a situation in which the air/fuel ratio downstream of the catalyst 3 has remained rich for greater than or equal to a continuous predetermined time. When the fixed determination time is exceeded, the output of the upstream air/fuel ratio sensor 4 is corrected.

The determination of whether or not the upstream air/fuel ratio sensor 4 is correct is performed by waiting for a certain time to elapse rather than on the basis of the moment when the air/fuel ratio downstream of the catalyst shifts from a stoichiometric ratio to a rich or lean value. However the exhaust gas air/fuel ratio may undergo large momentary fluctuations as a result of the operating conditions of the engine even when the output of the air/fuel ratio sensor is correct. In this situation, oxygen can not be adsorbed by the catalyst and as a consequence, the air/fuel ratio sensor 4 may sometimes be correct even when the air/fuel ratio downstream of the catalyst momentarily fluctuates from a stoichiometric ratio to a rich or lean value.

In order to prevent errors in the determination performed by the sensor, when the air/fuel ratio downstream of the catalyst has varied from a stoichiometric ratio to a rich or a lean value, it is determined that the sensor output is not correct when such a state has continued for greater than or equal to a predetermined time.

This invention is characterized in that the determination time is variably set on the basis of the operating conditions at the time.

Figure 2:
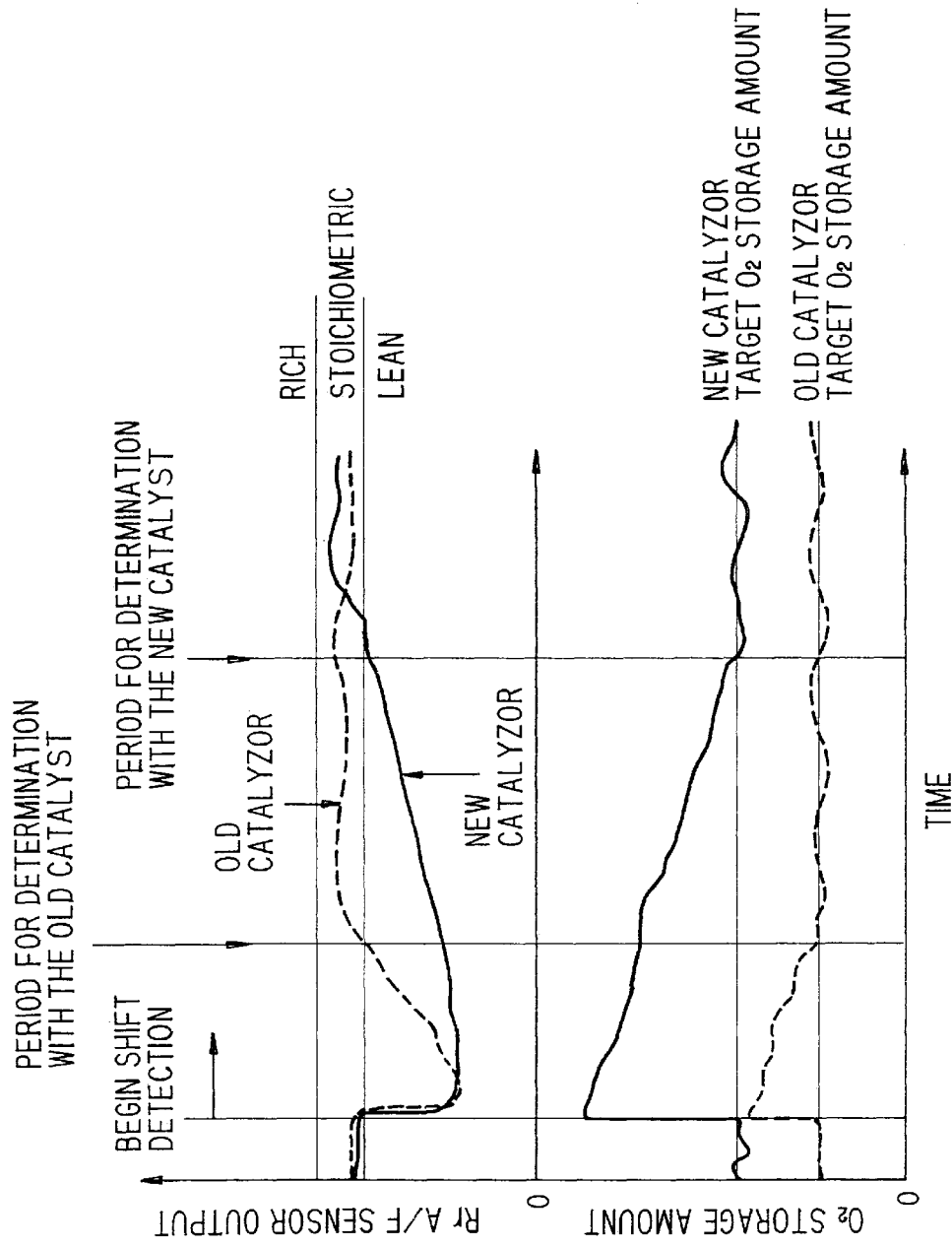
FIG. 2 shows output characteristics of a downstream air/fuel ratio sensor and the oxygen storage performance of a new catalyst compared to a catalyst which has undergone deterioration.

As shown in FIG. 2, the oxygen storage function varies with respect to the level of deterioration in the catalyst 3. When the catalyst 3 is new, the high oxygen storage performance allows highly effective adsorption of fluctuations in the air/fuel ratio. In contrast, adsorption performance for air/fuel ratio fluctuations decreases as deterioration in the catalyst 3 increases.

In this invention, the catalyst 3 is set so that the determination time is delayed when the catalyst 3 is new and thereafter it is advanced as deterioration in the catalyst 3 progresses. The level of deterioration in the catalyst 3 may be determined in response to the summed value of the traveled distance of the vehicle for example. Deterioration advances as the summed value for the traveled distance increases.

This control routine will be described in detail with respect to the flowchart in FIG. 3.

The control routine is repeated at a predetermined time by the controller 6 during operating conditions when the air/fuel ratio basically has a stoichiometric ratio.

Firstly in a step S1, air/fuel ratio control is performed based on the output of the air/fuel ratio sensor 4 upstream of the catalyst 3 so that the oxygen storage amount of the catalyst 3 coincides with a target value. As described above, this control comprises calculating the oxygen storage amount from the intake air amount and the air/fuel ratio at that time and comparing the summed value for the oxygen storage amount with a target oxygen storage amount. When the oxygen storage amount is less than the target value, the air/fuel ratio is revised from a stoichiometric value to a lean value. Conversely, when greater than the oxygen target value, the air/fuel ratio is revised to a rich value.

In a step S2, it is determined from the output of the downstream air/fuel ratio sensor 5 whether or not the air/fuel ratio downstream of the catalyst 3 is stoichiometric. When the air/fuel ratio is stoichiometric, the routine is terminated.

Although the exhaust gas air/fuel ratio downstream of the catalyst has a stoichiometric value as a result of the oxygen storage function of the catalyst 3, the downstream air/fuel ratio fluctuates from the stoichiometric to a lean or a rich value when the oxygen storage amount of the catalyst 3 is saturated or when all the oxygen is released.

When it is determined that the air/fuel ratio is not stoichiometric, the routine proceeds to a step S3 and the time from the shift to a rich or a lean value is measured. In a step S4, the measured time is compared with the determination time set in response deterioration condition of the catalyst 3 and it is determined whether or not the determination time has been reached. When the determination time has elapsed, it is determined that a shift (relative deviation) has occurred in the output of the upstream air/fuel ratio sensor 4 and the routine proceeds to a step S5. In the step S5, the output fluctuation amount of the upstream air/fuel ratio sensor 4, that is to say, the output shift amount is calculated. The calculation of the shift amount is performed as described above below.

Figure 4:
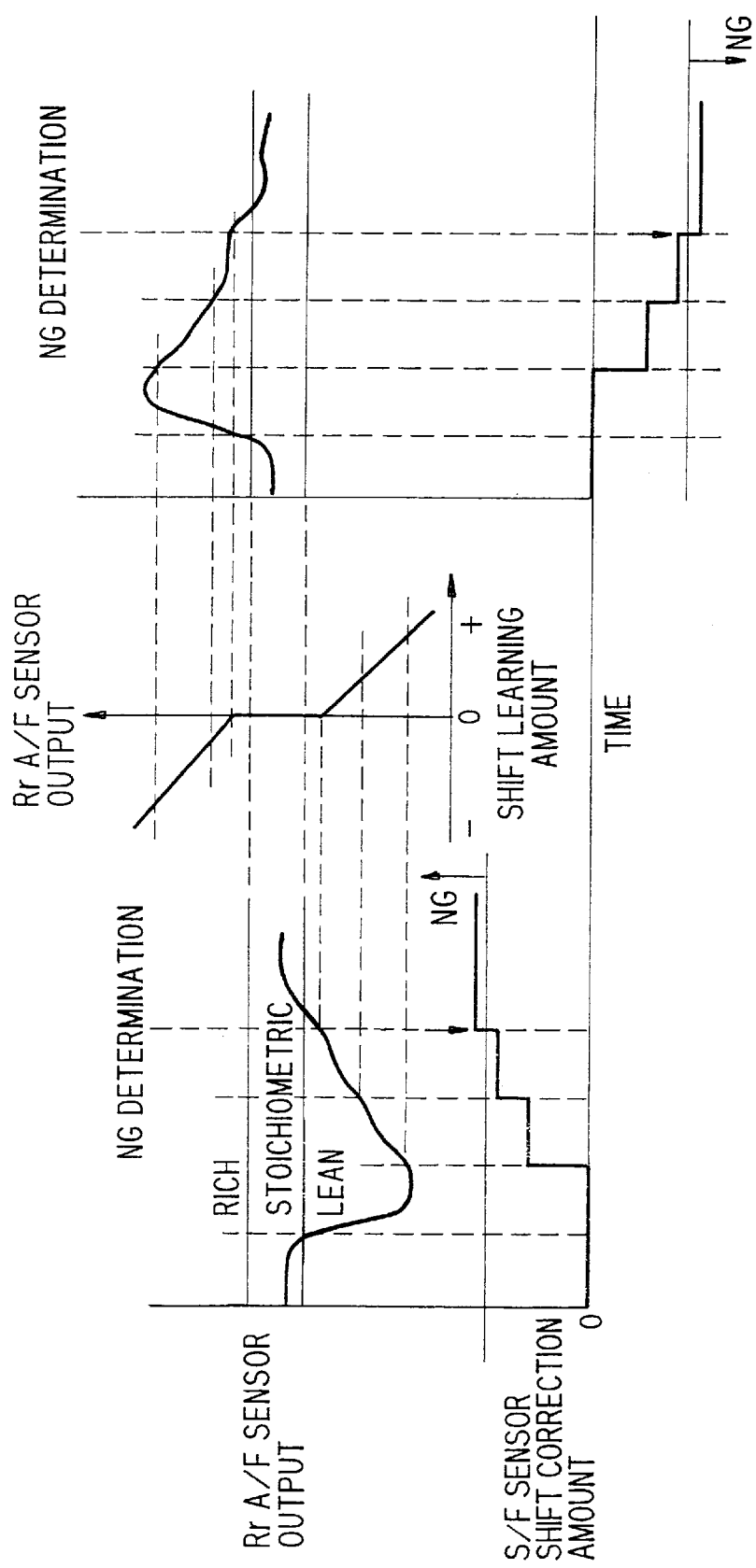
FIG. 4 shows the relationship between the air/fuel ratio downstream of the catalyst and the correction applied to the upstream air/fuel ratio sensor.

When the output of the upstream air/fuel ratio sensor 4 appears to have shifted to a richer value than the actual air/fuel ratio, the air/fuel ratio is controlled to a lean value by feedback control and the actual oxygen storage amount in the catalyst 3 becomes larger than the target value. When this control continues, the oxygen storage amount in the catalyst 3 is finally saturated, and the downstream air/fuel ratio shifts from stoichiometric to lean. In this case, as shown by the characteristics on the left side of FIG. 4, a correction by a fixed amount to a lean value is performed on the output of the upstream air/fuel ratio sensor 4.

Conversely when the output of the upstream air/fuel ratio sensor 4 appears to have shifted to a leaner value than the actual air/fuel ratio, the actual oxygen storage amount is less than the target value and finally takes a value of zero. Thus the downstream air/fuel ratio takes a richer value than the stoichiometric value. In this case, as shown by the characteristics on the right side of FIG. 4, a correction by a fixed amount towards a rich value is performed on the output of the upstream air/fuel ratio sensor 4 in order to correct the fluctuation in the output of the upstream air/fuel ratio sensor 4.

The result of the correction is stored as a learning value for air/fuel ratio control. The learning values are added sequentially when the correction is performed on a number of occasions until the downstream air/fuel ratio returns to a stoichiometric value. The air/fuel ratio continues to be revised by a fixed amount towards a rich value by these corrections.

Feedback control on the air/fuel ratio is performed based on the correction on the output of the upstream air/fuel ratio sensor 4.

In this case, the correction amount is not fixed but rather is varied in response to the dimension of the absolute value of the air/fuel ratio output detected by the downstream air/fuel ratio sensor 5. Thus the oxygen storage amount of the catalyst 3 converges to a target value in a short time after the correction.

Then in a step S6, it is determined that there is an abnormality in the upstream air/fuel ratio sensor 4 on the basis of the summed value for the correction corresponding to the shift in the sensor output.

When the correction on the upstream air/fuel ratio sensor 4 is summed and the absolute value of the summed value reaches a predetermined limiting value, it is determined that there is an abnormality in the air/fuel ratio sensor 4. When the summed correction on the output of the air/fuel ratio sensor 4 reaches a certain limit, deterioration in the sensor is extremely advanced. In this state, stable air/fuel ratio control becomes difficult and the possibility exists of adverse effects on exhaust emission control. Thus when an abnormality is detected, the driver can be advised of the need for repair or replacement in advance.

The shift amount in the sensor output is calculated as a positive fixed value when the downstream air/fuel ratio sensor 5 has a lean value, and is calculated as a negative fixed value when the sensor has a rich value. An abnormality is determined when the absolute value of the summed corrections reaches a pre-set limiting value. When an abnormality is not detected, the device is re-initialized and the above routine is repeated.

This limiting value is determined in the following manner.

The shift in the output characteristics of the air/fuel ratio sensor comprise a fluctuation component resulting from the level of catalyst deterioration, a fluctuation component due to variation in the environmental conditions and a fluctuation component due to discrepancies in the performance of the components comprising the sensor. The limiting value is defined when any of the components of the fluctuation exceed three times the value of the average deviation for the component. The limiting value is also determined from the regulating value of the regulation.

In the above control routine, the determination time in the step S4 when the downstream air/fuel ratio has deviated from a stoichiometric ratio to either rich or lean varies in response to the level of deterioration in the catalyst 3. For a new component which has not undergone deterioration, the determination time is delayed. The determination time is advanced as the catalyst deteriorates. In this manner, shift correction errors by the upstream air/fuel ratio sensor 4 can be avoided.

When the oxygen storage performance of the catalyst 3 is high, considerable time is taken after the upstream air/fuel ratio switches until the downstream air/fuel ratio varies since the highly effective adsorption of air/fuel ratio fluctuation is enabled. Thus when the catalyst components are new, the determination time for determining that the downstream air/fuel ratio has deviated from a stoichiometric ratio is delayed in comparison to a situation in which the catalyst has deteriorated. In this manner, it is possible to avoid unnecessary corrections on a shift in the output of the upstream air/fuel ratio sensor 4.

When the output of the upstream air/fuel ratio sensor 4 is corrected, the air/fuel ratio is varied in a stepwise manner by a fixed amount in an opposite direction to the direction of sensor shift. However whether variation in the air/fuel ratio reaches downstream of the catalyst depends on the oxygen storage performance of the catalyst 3. Consequently the delay is increased since air/fuel ratio variations are more effectively adsorbed the newer the catalyst components are.

Conversely since the oxygen storage performance is low when the catalyst has deteriorated and the adsorption performance on fluctuations in the air/fuel ratio is low, less time is required for the downstream air/fuel ratio varies after the upstream air/fuel ratio switches. Thus the correction on the shift in the upstream air/fuel ratio is accurately performed by advancing the determination time.

That is to say, when the downstream air/fuel ratio switches from stoichiometric to lean or rich, a first correction on the output of the upstream air/fuel ratio sensor is performed. Even when the air-fuel ratio upstream of the catalyst varies in a stepwise manner, the downstream air/fuel ratio does not immediately vary and the air/fuel ratio condition remains unchanged for some time. When this continuous time exceeds the determination time above, a second correction is performed. Thereafter when the condition remains unchanged, a third correction is performed in the same manner as above. After the air/fuel ratio is varied in a stepwise manner, when the downstream air/fuel ratio corresponds to a stoichiometric ratio before the determination time is reached, the correction is terminated in that state.

Since the determination time varies in response to the level of deterioration of the catalyst, the determination time is lengthened when the components are new. Consequently erroneous re-corrections are not performed even when variation of the downstream air/fuel ratio to a stoichiometric ratio is delayed by stepwise variation in the upstream air/fuel ratio.

In this manner, it is possible to suitably revise the output fluctuation in the upstream air/fuel ratio sensor 4 and to avoid increases in fuel economy or adverse effects on exhaust emission control.

Another embodiment will be described based on FIG. 5.

Even with the same level of deterioration, the operating condition of the engine at that time, that is to say, the determination time for the period in which the downstream air/fuel ratio deviates from a stoichiometric ratio varies in response to an intake air amount.

Figure 6:
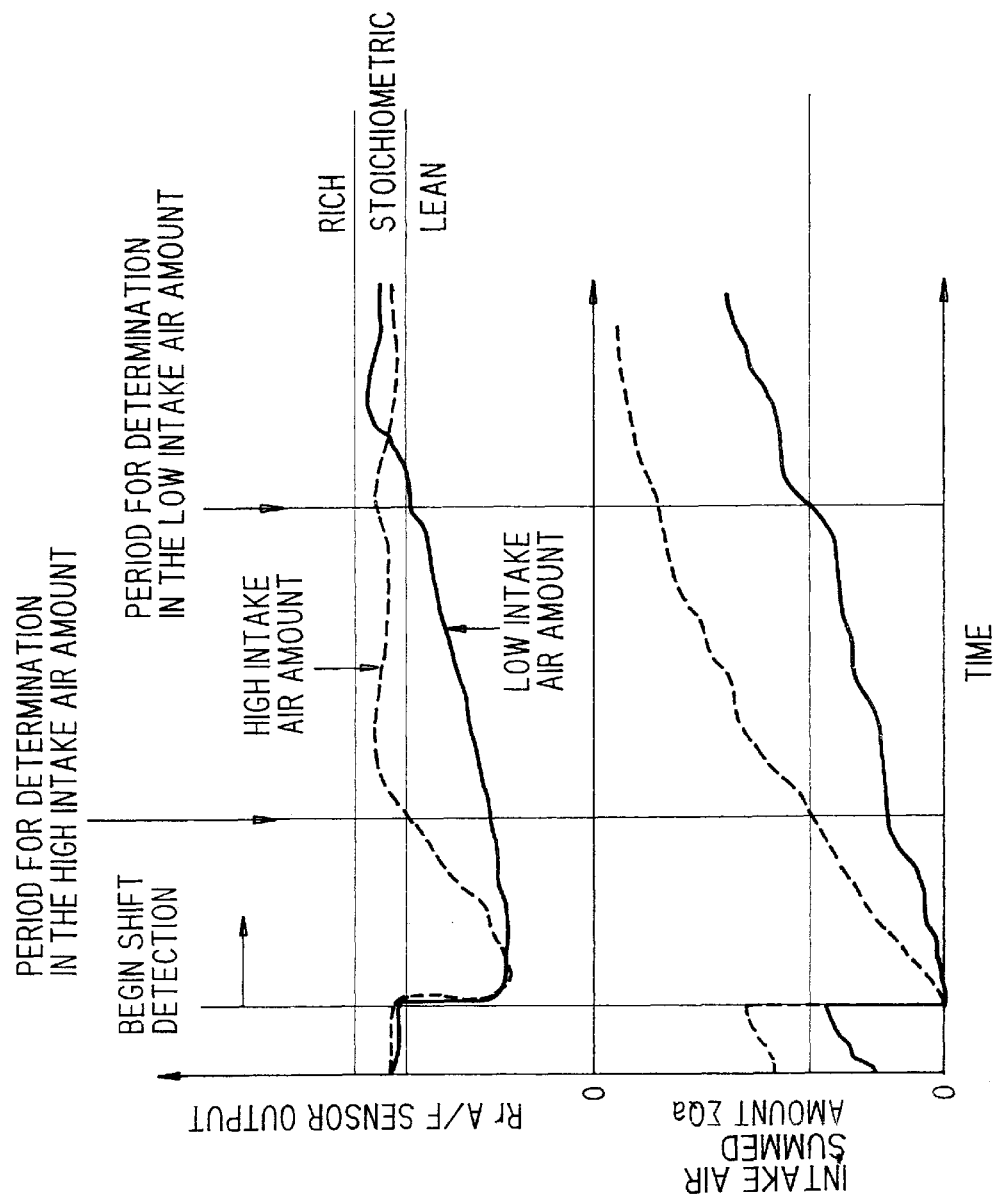
FIG. 6 shows the output characteristics of a downstream air/fuel ratio sensor when the intake air amount is varied.

As shown in FIG. 6, the time delay after the upstream air/fuel ratio switches until the downstream air/fuel ratio switches varies in response to the engine intake air amount. During idling in which the intake air amount is low, the time delay is increased by a corresponding amount in comparison to high-output engine operation associated with a large intake air amount.

The determination time varies in response to the dimension of the intake air amount and the determination time is delayed as the intake air amount decreases.

Figure 3:
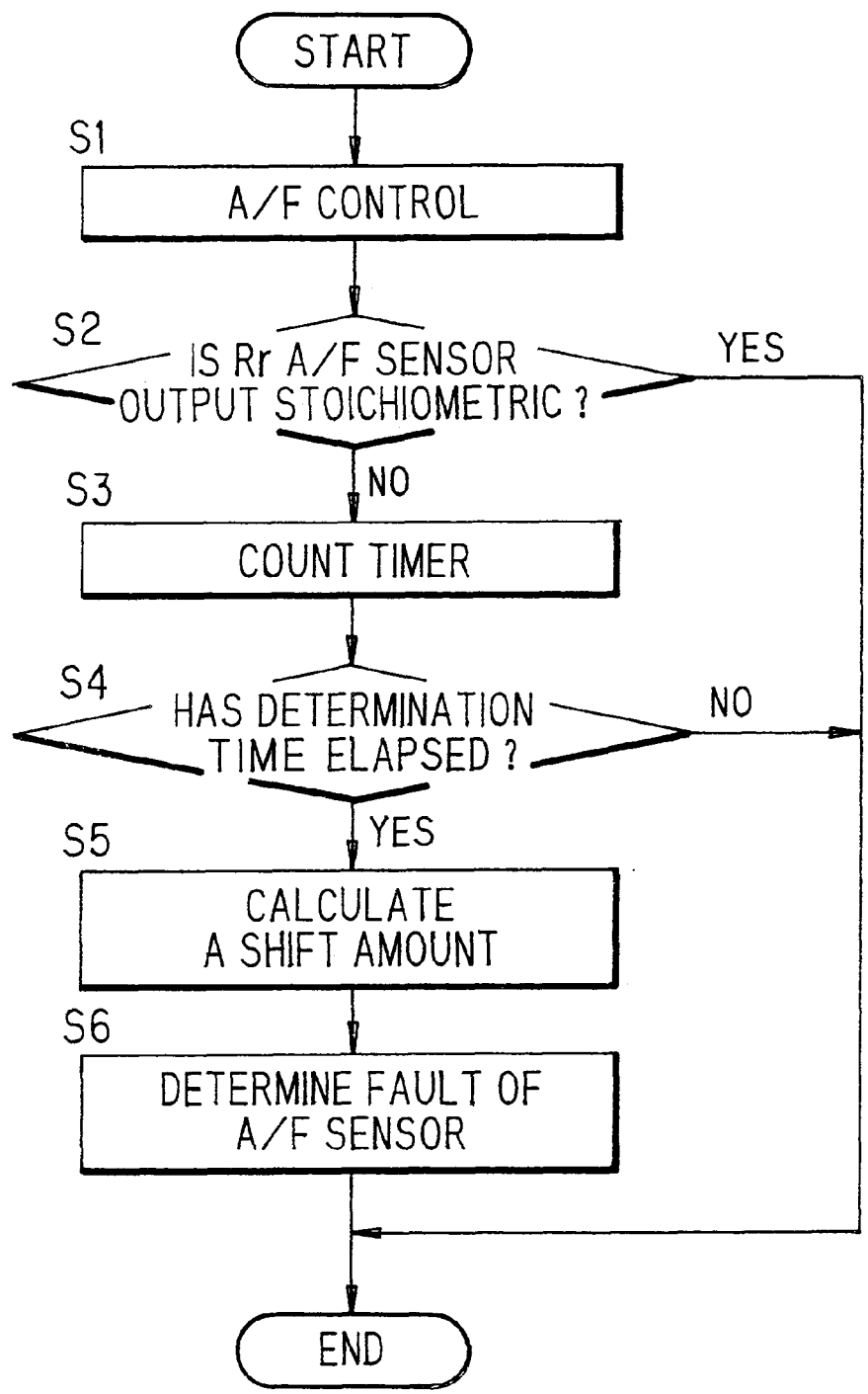
FIG. 3 is a flowchart showing the control performed on the air/fuel ratio sensor output.
Figure 5:
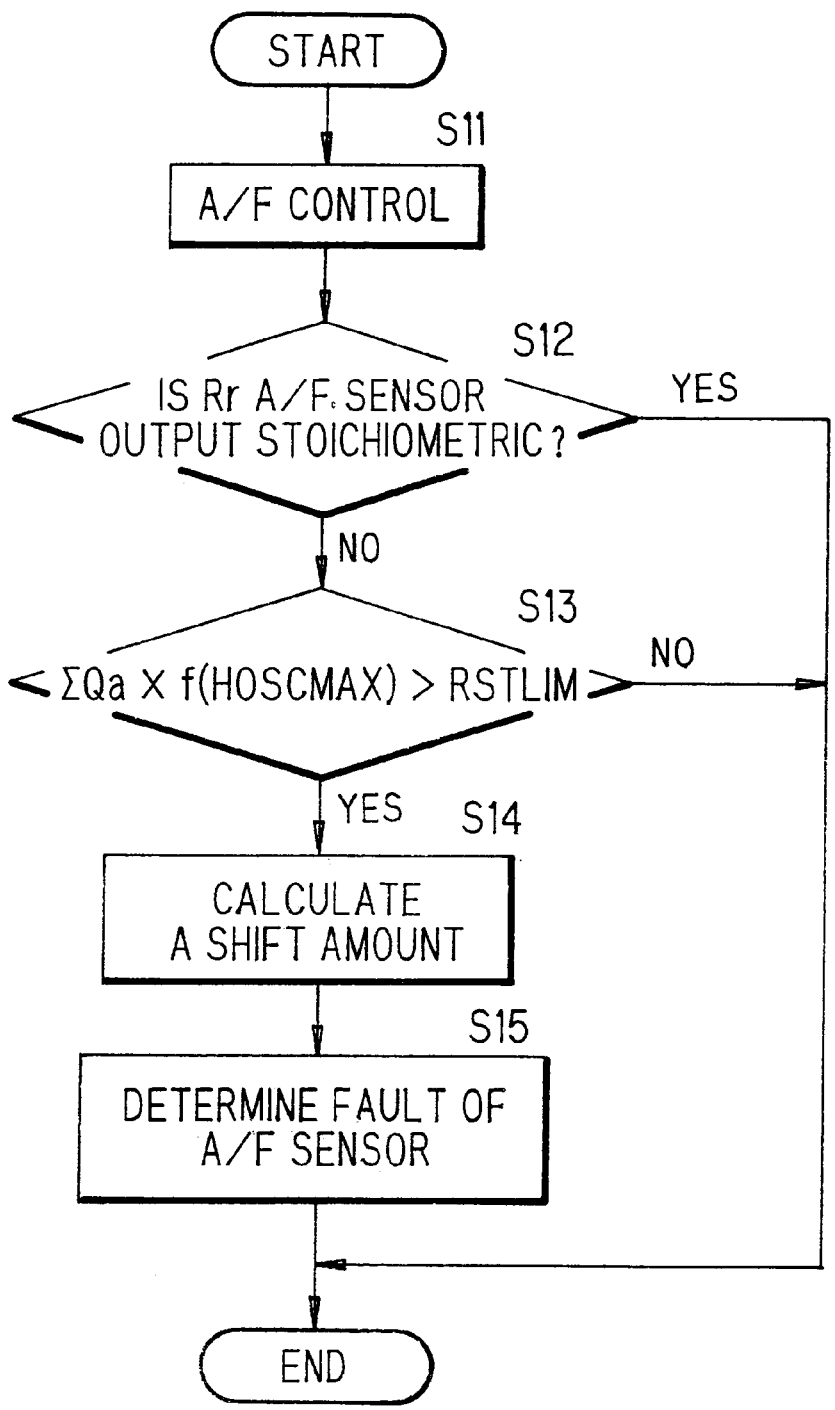
FIG. 5 is a flowchart showing a control routine according to a second embodiment of this invention.

Although this control routine has been described referring to FIG. 5, those elements which are common to the control routine in FIG. 3 have as a rule been omitted.

In a step S11, air/fuel ratio control is performed based on the output of the upstream air/fuel ratio sensor 4 so that the oxygen storage amount coincides with a target value in the same manner as the step S1. In a step S12, it is determined whether or not the air/fuel ratio is a stoichiometric ratio on the basis of the output of the downstream air/fuel ratio sensor 5. When it is determined that the downstream air/fuel ratio is not stoichiometric, that is to say, that the air/fuel ratio is lean or rich, the routine proceeds to a step S13. In the step S13, the summed value of the intake air amount is calculated as $\Sigma Qa \times f$ (HOSCMAX) and this value is compared with a predetermined determination value RSTLIM.

Figure 7:
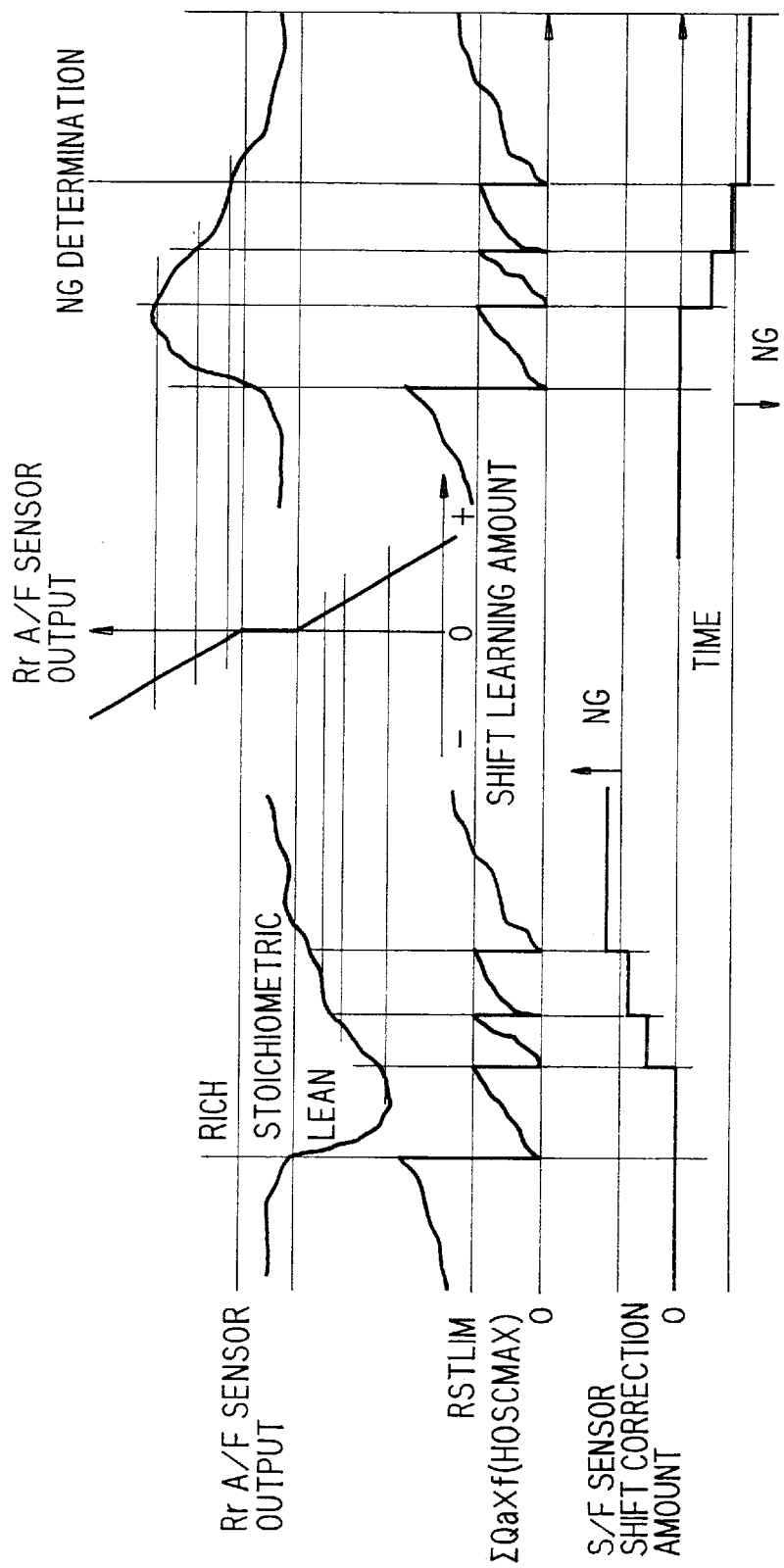
FIG. 7 shows the relationship of the air/fuel ratio downstream of the catalyst to the correction applied to the upstream air/fuel ratio sensor.

As shown in FIG. 7, the output of the downstream air/fuel ratio sensor 5 varies from stoichiometric to lean. When the summed value of the time after the air/fuel ratio has varied to a lean value exceeds the determination value, the output of the upstream air/fuel ratio sensor 4 is regarded as having undergone fluctuation and a correction on the output is performed. When the intake air amount is relatively low, considerable time is required until the determination value is reached. When the intake air amount is relatively large, the time taken to reach the determination value is shortened. When the downstream air/fuel ratio has not undergone variation during this time, that is to say, when a shift from a stoichiometric ratio remains, a correction on the output shift of the upstream air/fuel ratio sensor 4 is performed in a step S14.

In this manner, the time taken to reach the determination value lengthens or shortens in response to the intake air amount. As a result, the determination time is delayed or advanced in the same manner in response to the intake air amount and a shift in the upstream air/fuel ratio sensor 4 can be determined.

In a step S15, an abnormality in the sensor is determined in the same manner as the step S6.

Even when a correction in the upstream air/fuel ratio sensor 4 is performed and the sensor has returned to normal state, the time taken for this to be confirmed downstream varies in response to the air intake amount at that time, that is to say, the exhaust gas flowrate. When the air amount is low during idling for example, even when the upstream air/fuel ratio switches from lean to stoichiometric, considerable time is taken until the downstream section has a stoichiometric value. When it is determined that the air/fuel ratio has a lean value again during this period, another correction is performed on the output of the upstream air/fuel ratio sensor 4. However this does not reflect the actual conditions. However in effect, the determination time is delayed when the intake air amount is small since the summed value for the intake air amount is compared to a pre-set determination value. As same way the determination time is advanced when the air intake amount is large, it is possible to always perform an accurate determination.

The second embodiment may be combined with the first embodiment. For example, the dimension of the determination value which is compared with the summed value for the intake air amount may be varied in response to the level of deterioration of the catalyst. That is to say, the determination value decreased as the level of catalyst deterioration increases. In this manner, an accurate determination corresponding to the intake air amount at that time can be performed in response to the level of deterioration in the catalyst 3.

The entire contents of Japanese Patent Application P2001-227010 (filed Jul. 27, 2001) is incorporated herein by reference.

This invention is not limited to the above embodiments and may be changed in various ways within the scope of the inventive concept.

What is claimed is:

1. An air/fuel ratio control device for an internal combustion engine, comprising:
a catalyst provided in an exhaust gas pipe of the internal combustion engine, the catalyst having an oxygen storage function in which oxygen in the exhaust gas is adsorbed or released in response to the air/fuel ratio of the exhaust gas;
an air/fuel ratio sensor disposed upstream of the catalyst in the exhaust gas pipe;
an air/fuel ratio sensor disposed downstream of the catalyst in the exhaust gas pipe; and
a controller which controls the air/fuel ratio, the controller functioning to:
estimate an oxygen storage amount of the catalyst based on the output of the air/fuel ratio sensor upstream of the catalyst;
control the air/fuel ratio so that the oxygen storage amount coincides with a target value;
perform a variable setting the determination time on the output of the air/fuel ratio sensor downstream of the catalyst in response to operating conditions of the internal combustion engine; and
correct the output of the upstream air/fuel ratio sensor when the continuous time after the output of the air/fuel ratio sensor downstream of the catalyst switches to a rich or a lean value exceeds the determination time,
wherein a correction on the output of the upstream air/fuel ratio sensor is performed towards lean values when the output of the downstream air/fuel ratio sensor is rich, and when the output of the downstream air/fuel ratio sensor is lean, it is corrected towards rich values.

2. The air/fuel ratio control device for an internal combustion engine as defined in claim 1, wherein the determination time is set in response to the level of deterioration in the catalyst.

3. The air/fuel ratio control device for an internal combustion engine as defined in claim 2, wherein the determination time is advanced as the level of deterioration in the catalyst increases.

4. The air/fuel ratio control device for an internal combustion engine as defined in claim 1, wherein the determination time is set in response to the operating conditions of the internal combustion engine.

5. The air/fuel ratio control device for an internal combustion engine as defined in claim 4, wherein the determination time is set based on the intake air amount of the internal combustion engine.

6. The air/fuel ratio control device for an internal combustion engine as defined in claim 5, wherein the determination time is advanced as the intake air amount increases.

7. The air/fuel ratio control device for an internal combustion engine as defined in claim 1, wherein the dimension of the correction on the output of the upstream air/fuel ratio sensor is set in response to the output of the downstream air/fuel ratio sensor.

8. The air/fuel ratio control device for an internal combustion engine as defined in claim 1, wherein the controller determines an abnormality in the upstream air/fuel ratio sensor in response to a summed value of the correction amount.

9. An air/fuel ratio control device for an internal combustion engine, comprising:
a catalyst provided in an exhaust gas pipe of the internal combustion engine, the catalyst having an oxygen storage function in which oxygen in the exhaust gas is adsorbed or released in response to the air/fuel ratio of the exhaust gas;
means for detecting an air/fuel ratio disposed upstream of the catalyst in the exhaust gas pipe;
means for detecting an air/fuel ratio disposed downstream of the catalyst in the exhaust gas pipe;
means for estimating an oxygen storage amount of the catalyst based on the output of the means for detecting an air/fuel ratio disposed upstream of the catalyst;
means for controlling the air/fuel ratio so that the oxygen storage amount coincides with a target value;
means for performing a variable setting the determination time on the output of the means for detecting an air/fuel ratio disposed downstream of the catalyst in response to the operating conditions of the internal combustion engine; and
means for correcting the output of the means for detecting an air/fuel ratio disposed upstream when the continuous time after the output of the means for detecting an air/fuel ratio disposed downstream of the catalyst switches to a rich or a lean value exceeds the determination time,
wherein a correction on the output of the means for detecting an air/fuel ratio disposed upstream is performed towards lean values when the output of the means for detecting an air/fuel ratio disposed downstream is rich, and when the output of the means for detecting an air/fuel ratio disposed downstream is lean, it is corrected towards rich values.

10. A method for controlling an air/fuel ratio of an exhaust gas of an internal combustion engine, the internal combustion engine comprising a catalyst provided in an exhaust gas pipe of the internal combustion engine, the method comprising:
estimating an oxygen storage amount of the catalyst based on an output of an air/fuel ratio sensor upstream of the catalyst;
controlling the air/fuel ratio so that an oxygen storage amount of the catalyst coincides with a target value;
performing a variable setting the determination time on an output of an air/fuel ratio sensor downstream of the catalyst in response to operating conditions of the internal combustion engine;
correcting the output of the upstream air/fuel ratio sensor when the continuous time after the output of the air/fuel ratio sensor downstream of the catalyst switches to a rich or a lean value exceeds the determination time; and
performing a correction on the output of the upstream air/fuel ratio sensor towards lean values when the output of the downstream air/fuel ratio sensor is rich, and when the output of the downstream air/fuel ratio sensor is lean, performing a correction towards rich values.

* * * * *